Sept. 20, 1966  H. L. PASTAN  3,273,400

PRESSURE CELL

Filed Sept. 8, 1964

INVENTOR
HARVEY L. PASTAN

BY
Wolf, Greenfield + Hieken
ATTORNEYS

United States Patent Office 3,273,400
Patented Sept. 20, 1966

3,273,400
PRESSURE CELL
Harvey L. Pastan, Brookline, Mass., assignor to Dynisco, Division of American Brake Shoe Company, Cambridge, Mass., a corporation of Delaware
Filed Sept. 8, 1964, Ser. No. 394,910
10 Claims. (Cl. 73—398)

This invention relates to fluid pressure sensing transducers, and more particularly to a new and improved bonded strain gage transducer for providing a measurement of fluid pressures.

Bonded strain gage tranducers for use in measuring fluid pressures are of course known. One type of strain gage transducer includes a pressure cell defined by inner and outer deformable generally cylindrical walls that form an annular space for fluid whose pressure is to be measured. Strain gage windings are bonded to the inner and outer walls and are connected to form four active legs of a bridge circuit. Although the inner and outer walls are made of the same material, they are not necessarily formed from the same stock and therefore do not have precisely the same temperature coefficient of expansion, modulus of elasticity, etc. The lack of uniformity of such porperties produces second order effects which impair the accuracy of the gage.

The accuracy of such gages is also dependent upon the inner and outer walls remaining at the same temperature. Thermal conductivity between the inner and outer walls is impeded at the mechanical connection between the walls, and as a result the walls do not experience the same temperature changes as the result of changes in temperature of the surrounding medium.

One important object of this invention is to provide a strain gage pressure transducer capable of measuring with greater accuracy changes in fluid pressure.

Another important object of this invention is to provide a strain gage pressure transducer which is comprised of relatively few parts, is relatively small and is rugged to give extended trouble-free service.

A more specific object of this invention is to improve the accuracy of strain gage transducers by minimizing second order effects which cause extraneous deformation of the parts.

Yet another specific object of this invention is to impove the thermal conductivity between the deformable walls of a bonded strain gage pressure transducer.

To accomplish these and other objects, the pressure transrucer of this invention includes a generally cylindrical wall and a body connected to the wall so as to define two annular chambers at different portions of the wall with one of the chambers being defined in part by the inner surface of the wall while the other of the chambers is defined by the outer surface of the wall. Means are provided for impressing on the chambers the pressure of the medium to be measured, and means are secured to the different portions of the wall for measuring the deformation experienced by those portions resulting from the impressed pressure.

These and other objects and features of this invention, along with its incident advantages, will be better understood and appreciated from the following detailed description of two embodiments thereof, selected for purposes of illustration and shown in the accompanying drawing, in which.

Figure 1:
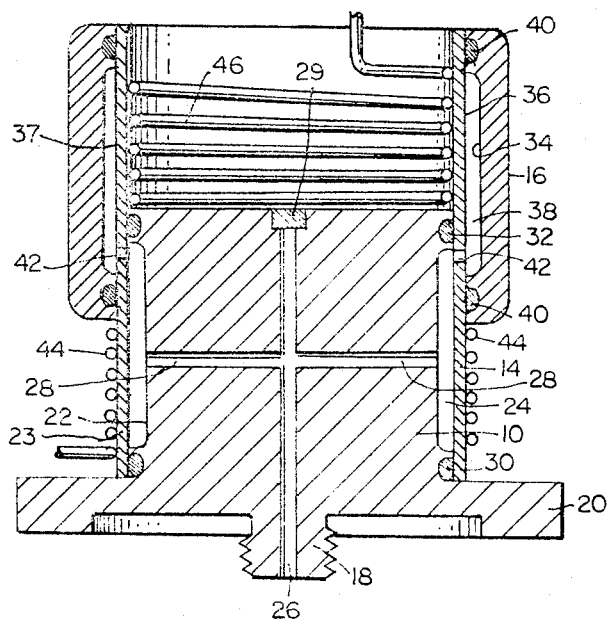
FIG. 1 is a cross-sectional elevation view of a bonded strain gage pressure tranducer constructed in accordance with this invention.

In FIG. 1 an embodiment of this invention is shown, which includes a body 10, a surrounding cylinder 14 made of a deformable material and a sleeve 16. The body is provided with an externally threaded fitting 18 adapted to be screwed into the wall of a chamber containing the fluid whose pressure is to be measured. The body 10 also includes an outwardly extending flange 20 which will bear against the outer surface of the wall of the chamber and will form a firm stop to limit the depth that the fitting 18 may be screwed into the opening in the wall. A sealing gasket may also be used if necessary to form a liquid tight seal.

An annular recess 22 is formed in the outer surface of the body 10 and defines with the lower portion 23 of the surrounding cylindrical wall 14 a first annular chamber 24. The chamber 24 is in communication with the fitting 18 by means of an axial passage 26 provided in the body and radial passages 28 extending from the passage 26. Thus, fluid may enter the body through the passage 26 and flow through the radial passages 28 to fill the annular chamber 24. The upper end of the axial passage 26 is sealed by plug 29. The body 10 is brazed or otherwise secured to the inner surface of the wall 14 as suggested at 30 and 32 which prevents any leakage of fluid from the annular chamber 24.

The sleeve 16 surrounds the upper portion of the cylindrical wall 14 and is provided with an annular recess 34 in its inner surface, which cooperates with the outer surface 36 of the upper portion 37 of the wall 14 to define a second annular chamber 38. The lower and upper portions 23 and 37 of the wall are of substantially the same length. The upper and lower ends of the sleeve 16 are brazed or otherwise secured to the outer surface 36 of the cylindrical wall 14 as suggested at 40, which prevent leakage from the chamber 38.

Figure 3:
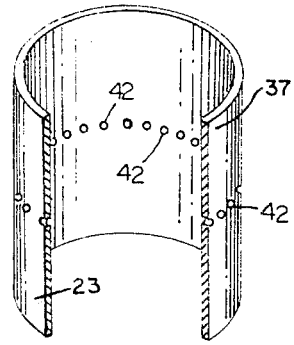
FIG. 3 is a fragmentary perspective view of a component of the transducers shown in FIGS. 1 and 2.

Chamber 38 communicates with chamber 24 through a plurality of small holes 42, particularly evident in FIG. 3, provided in the cylindrical wall 14 in that portion of the wall where the lower end of the sleeve 16 overlaps the upper end of the body 10. Thus, fluid which enters the passage 26 through the fitting 18 will flow through the radial passages 28 and fill the annular chambers 24 and 38.

A pair of wire strain gages 44 are wound about and bonded to the outer surface of the portion 23 of the cylindrical wall 14, which defines the annular chamber 24. A second pair of wire strain gages 46 are bonded to the inner surface of the portion 37 of the cylindrical wall 24, which defines the inner wall of the annular chamber 38. As suggested in FIG. 4, each of the wire strain gages forms one leg of a bridge circuit 48 which may be energized from some remote location through lines $L_1$ and $L_2$. A meter (not shown) may be connected to the bridge at some remote location across terminals $T_1$ and $T_2$ to measure the voltage across the bridge.

Figure 4:
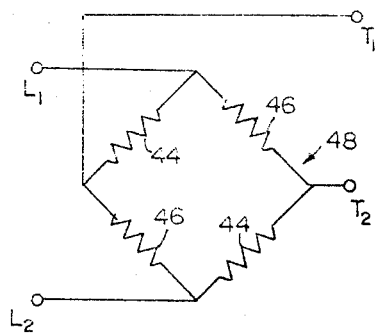
FIG. 4 is a schematic diagram showing the sensing circuit of this invention.

In operation the pressure tranducer, as suggested above, is screwed into an opening in the wall of a chamber containing the fluid to be measured. The fluid is allowed to enter the annular chambers 24 and 38 through the axial passage 26 and the radial passages 28 and the pressure of the fluid is exerted against the walls of the chambers. The cylindrical wall 14 which is relatively thin and therefore deformable will barrel outwardly over that portion below the sleeve 16 which defines the outer wall of the chamber 24. The same pressure exerted by the fluid in the chamber 38 against the upper portion of the cylindrical wall 14 above the body 10 will cause that portion to deform radially inwardly in response to the pressure. The extent of the deformation of the upper and lower deformable portions of the wall 14 will vary with variations in the pressure of the fluid in the chambers 24 and 38. The deformation of the two portions of the cylindrical wall causes deformation of the strain gages bonded to them. With the strain gages connected in a bridge circuit as depicted in FIG. 4, an electrical signal is produced which will vary with the pressure exerted against the wall 14 from the chambers 24 and 38. With the gages connected as shown maximum sensitivity is realized. A meter connected across the terminals $T_1$ and $T_2$ can indicate at some remote location the extent of the deformation of the different portions of the cylindrical wall 14, and that deformation is proportional to the pressure of the fluid.

Figure 2:
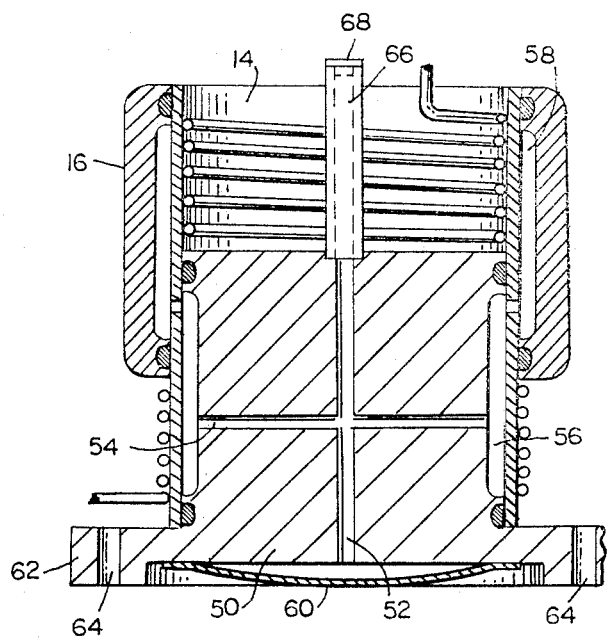
FIG. 2 is a cross-sectional view similar to FIG. 1 and showing another embodiment of this invention.

In FIG. 2 a second embodiment is shown very similar to that of FIG. 1. The gage includes cylindrical wall 14 and sleeve 16 substantially identical to the corresponding parts of the gage shown in FIG. 1. The body 50 differs slightly from the body 10 in that the fitting 18 is not provided. Unlike the embodiment of FIG. 1, the gage of FIG. 2 does not receive the fluid whose pressure is to be measured but rather the axial and radial passages 52 and 54 in the body and the annular chambers 56 and 58 are prefilled with a noncompressible fluid. The annular chambers and the passages are maintained in the filled state by a soft diaphragm 60 which extends across the bottom of the body within the flange 62. It will be noted that holes 64 are provided in the flange to anchor the body 50 over a wall having an opening which exposes the fluid whose pressure is to be measured. In this manner the pressure of that fluid is exposed to the bottom of the diaphragm 60 which in turn deflects upwardly as shown in FIG. 2 to apply the pressure of that fluid to the fluid which fills the passages 52 and 54 and the chambers 56 and 58.

The passages 52 and 54 and the chambers 56 and 58 are filled through fill tube 66 secured to the top of the body 50 in communication with the top of the axial passage 52. The fill tube 66 may be closed by a plug 68 brazed or otherwise secured to the end of the tube after the tube is filled.

While the gage of FIG. 1 fills with the fluid whose pressure is being measured, which fluid directly applies its pressure against the deformable walls of the annular chambers 24 and 38, in the embodiment of FIG. 2 the fluid whose pressure is being measured exerts a force against the soft diaphragm 60 which in turn transmits the pressure to the fluid which fills the gage to exert the pressure on the deformable walls. Just as in the embodiment of FIG. 1, the strain gage windings wound about the lower portion of the wall 14 and within the upper portion of that wall produce a signal proportional to the distortion of the walls.

From the foregoing description it will be appreciated that the same metal part, namely the cylindrical wall 14 comprises the outer wall of one chamber and the inner wall of the other. Therefore, the outer and inner walls of the chambers 24 and 38, respectively, have the same temperature coefficient of expansion, the same modulus of elasticity, etc. Therefore, the second order effects experienced by other gages and caused by changes in temperature, etc. are minimized. It will also be appreciated from the foregoing description that as the two sections of wall whose distortion is measured are of the same metal part, those two sections of wall will be at substantially the same temperature, and each will experience to same change in temperature in response to changes in the surrounding conditions. No significant temperature differential will be created in the two sections as there are no joints to create thermal barriers between the separate parts.

Certain less obvious advantages which are nevertheless equally important are also derived from the configuration of gages shown. Each of the two chambers is defined in part by a relatively thick wall; that is, the chamber 24 is defined in part by the body 10 which is of considerable mass, and the chamber 38 is defined in part by the sleeve 16 which has an appreciably greater mass than the cylindrical wall 14. These heavy portions of the gage provide a relatively large heat sink to absorb the substantial heat which is liberated during adiabatic pressure changes of the fluid in the chambers 24 and 28. In the absence of the heavy wall sections to absorb the heat, the heat would necessarily have to be absorbed in the thin cylindrical wall 14, and the substantial heat liberated during adiabatic pressure changes could cause considerable distortion of the different portions of the cylindrical wall, which would produce substantial error in the signal of the strain gage.

As yet another advantage of this invention the upper of the two chambers may be acoustically lagged with respect to the lower chamber to prevent pressure spikes from causing the upper portion of the cylindrical wall 14 to buckle due to peak loads. At the lower end of the pressure range of the gage, buckling of the wall at the upper chamber rather than bursting of the wall at the lower chamber occurs under peak loads, and by restricting the orifices 42 in the cylindrical wall, the transmission of shock in the system from the lower chamber to the upper chamber may be controlled.

From the foregoing description it will be appreciated that the transducer consists of relatively few parts, yet is of rugged construction so as to provide an extended service life. It will also be apparent that the transducer is suited for manufacture in relatively small sizes. For example, a transducer of this invention for measuring fluid pressures in the 3,000 p.s.i. range may have an overall length of approximately one inch and a diameter of approximately ½ inch. The cylindrical wall 14 may have a thickness of approximately .010 inch for the 3,000 p.s.i. transducer. In lower ranges the wall thickness may be correspondingly reduced.

Those skilled in the art will appreciate that modifications may be made of this invention without departing from its spirit. For example, the upper portion of the body 10 brazed to the cylindrical wall 14 may lie radially opposite the lower portion of the sleeve 16 brazed to the outer surface of the cylindrical wall. In this arrangement, a second radial passage in the body may serve to connect the axial passage 26 to the annular chamber 38. In such an arrangement the two chambers would be connected although not directly by holes provided in the cylindrical wall 14 as in FIG. 3. Rather they would be connected by axial and radial passages in the body.

Because numerous modifications may be made of this invention, it is not intended to limit the scope of the invention to the specific embodiments illustrated and described. Rather, it is intended that the scope of this invention be determined by the appended claims and their equivalents.

What is claimed is:

1. A pressure sensing transducer comprising
   a generally deformable cylindrical wall,
   a body disposed within the wall and having an outer surface spaced from it and defining with one portion of the wall a first annular chamber within the wall,
   a sleeve surrounding a second portion of the wall and having an inner surface spaced from the second portion to define with it a second annular chamber displaced axially from the first chamber,
   a passage in the wall placing the first and second annular chambers in communication with one another,
   a passage in the body in communication with at least one of the two chambers,
   strain windings secured to the outer surface of the first portion of the wall surrounding the first chamber and the inner surface of the second portion of the wall within the second chamber,
   and means including the passages for impressing the pressure of a medium to be measured upon the walls of the chambers.

2. A pressure sensing transducer as defined in claim 1 further characterized by
the wall being sealed to the body and sleeve at the axial extremes of each chamber.

3. A pressure sensing transducer comprising
a generally cylindrical wall,
a body member connected to the wall and defining with the wall two annular chambers at different portions of the wall, one of said chambers being defined by the inner surface of the wall and the other by the outer surface of the wall,
means for impressing on the chambers the pressure of the medium to be measured,
and means secured to the portions of the wall for measuring the deformations of those portions resulting from the impressed pressures.

4. A pressure transducer comprising
a body,
a first hollow member surrounding said body and radially spaced therefrom to form a first expansible chamber,
a second hollow member surrounding a portion of the first hollow member and radially spaced therefrom to form a second expansible chamber axially displaced from the first chamber,
means including a fluid inlet passage provided in the body and communicating with the expansible chambers,
and strain winding bonded to the first hollow member at the location of the first and second chambers.

5. A pressure transducer as defined in claim 4 further characterized by
a fitting connected to said body and communicating with the passage in the body for filling the chambers with the fluid whose pressure is to be measured.

6. A pressure transducer as defined in claim 4 further characterized by
a soft diaphragm secured to the body and covering the inlet passage,
and a fluid filling the two chambers and the passage for exerting forces upon the expansible chambers in response to pressure exerted against the diaphragm.

7. A pressure transducer comprising
a deformable cylindrical wall,
means disposed within and about the wall cooperating with it to form two axially displaced chambers, said means being of substantially greater mass than the wall and being nondeformable within the contemplated pressure range of the transducer,
one of said chambers being defined by the inner surface and the other by the outer surface of said wall,
means for impressing the pressure of the fluid being measured upon the walls of the chambers,
and means for measuring the deformation of the deformable wall in response to the impressed pressure.

8. A pressure transducer as defined in claim 7 further characterized by
passages provided in the means for introducing the fluid whose pressure is to be measured into the chambers.

9. A pressure transducer as defined in claim 7 further characterized by
a noncompressible liquid filling the two chambers,
and means including a soft diaphragm retaining the liquid to be measured against the diaphragm.

10. A pressure transducer as defined in claim 8 further characterized by
said passage communicating with one of the chambers,
and means including a restricted opening between the one of the chambers and the other chamber for introducing the fluid to be measured into the other chamber.

References Cited by the Examiner

UNITED STATES PATENTS 2,942,219  6/1960  McGrath _____ 73—398 X

LOUIS R. PRINCE, *Primary Examiner.*